Feb. 25, 1964     L. B. REYNOLDS     3,121,901
WINDSHIELD WIPER BLADE AND ATTACHMENT FOR SAME
Filed July 5, 1962
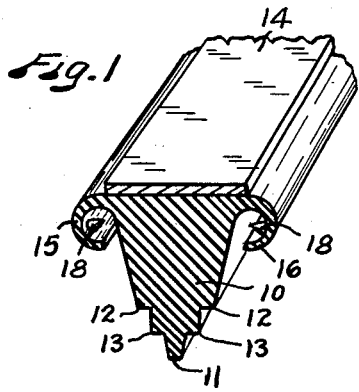
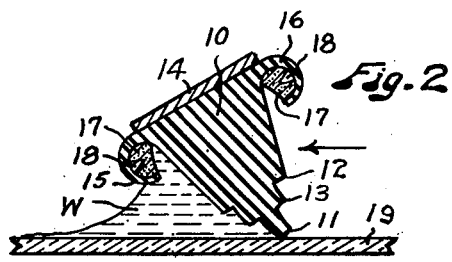
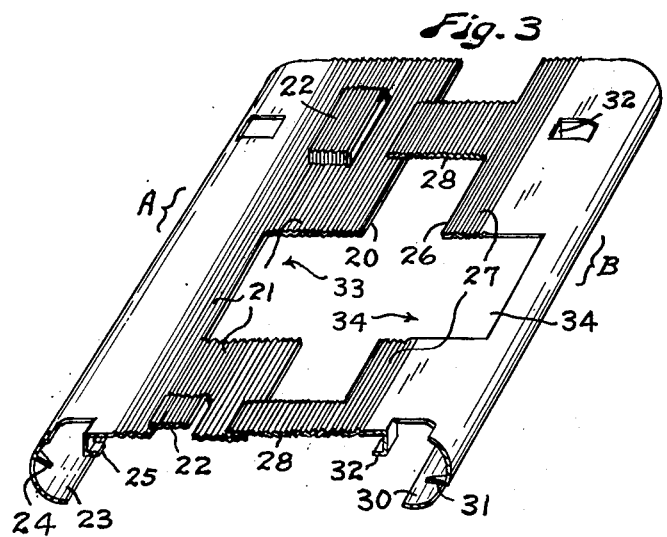
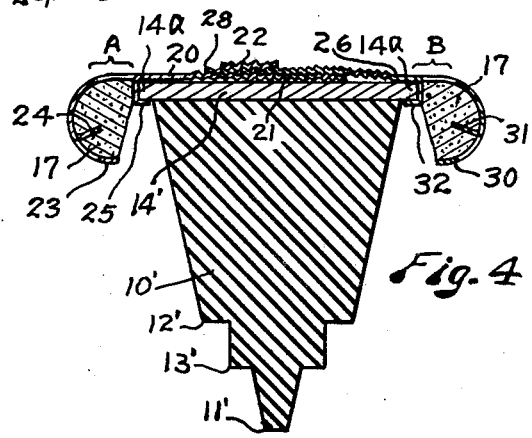
INVENTOR.
Loyal B Reynolds
BY Fred C. Matheny
ATTORNEY.

United States Patent Office 3,121,901
Patented Feb. 25, 1964

3,121,901
WINDSHIELD WIPER BLADE AND ATTACHMENT FOR SAME
Loyal B. Reynolds, 255 SW. 171st St., Seattle 66, Wash.
Filed July 5, 1962, Ser. No. 207,631
6 Claims. (Cl. 15—250.03)

My invention relates to improvements in windshield wiper blades and attachments for the same and my present invention is in the nature of an improvement on the windshield wiper blade disclosed in my prior patent application Serial Number 141,154, filed September 27, 1961.

An object of this invention is to simplify and reduce the cost of production of windshield wiper blades and blade attachments which are designed to carry de-greasing material in solid form and in such a manner that the de-greasing material will be applied to a windshield by the operation of the blade when water is present on the windshield.

Motor vehicle windshields collect oil-laden road dust which is not readily removed by a wiper blade when only water is present on the windshield. This is particularly true when the operation of a windshield wiper blade over a dirty windshield is first started. When water is present on a dirty windshield and a wiper blade begins to operate over the same oil will be picked up by the edge of the blade which is in contact with the windshield and spread on the windshield in the form of a film which impairs the vision of the driver. This oil film is on both the wiper blade and the windshield and it is not readily removed by the use of water alone. This invention provides for applying de-greasing material to both the wiper blade and the windshield and this facilitates the quick and easy removal of oil from the windshield and makes driving easier and safer.

A general object of this invention is to provide a windshield wiper blade having means associated therewith which carries de-greasing material in solid form and is capable of making a proper amount of this de-greasing material available and applying it to the exterior of the blade and to the part of the windshield over which the blade moves when water is present on the windshield and the blade is in operation so that grease and like solid matter on the windshield and on the wiper blade will be softened up and at least partially dissolved to such an extent that the blade will quickly remove the oil film from the windshield and will keep the windshield clean.

Another object of this invention is to provide a windshield wiper blade which has a body of de-greasing material of solid but slightly soluble form disposed along at least one side thereof outwardly from the edge part of the blade which rubs against the windshield and in a position where it will be contacted by water if water is present on the windshield.

Another object is to provide readily attachable means carrying de-greasing material and which can be applied quickly and easily to a conventional windshield wiper blade.

Other objects of this invention will be apparent from the following description taken in connection with the accompanying drawings.

In the drawings:

FIGURE 1 is a perspective view partly in cross section and on an enlarged scale showing a windshield wiper blade constructed in accordance with this invention, said blade having integrally formed receptacles for receiving de-greasing material in solid form, the de-greasing material being omitted.

FIG. 2 is a cross sectional view of the windshield wiper blade shown in FIG. 1 as it may appear when in operation and with de-greasing material in the receptacles thereof.

FIG. 3 is a fragmentary exploded perspective view with parts in cross section showing a pair of de-greasing material receptacles made in accordance with my invention, said receptacles being constructed so that they can be applied to conventional windshield wiper blades of types now in common use.

FIG. 4 is a sectional view showing the devices of FIG. 3 applied to a windshield wiper blade which may be of a type now in common use.

FIG. 1 shows a windshield wiper blade including a symmetrical body 10 of elastic material of generally triangular cross sectional shape having at its inner edge a relatively thin windshield engaging wiper blade part 11. Preferably the body 10 is longitudinally notched on both sides adjacent the wiper part 11 to provide thereon one or more cleaning edges 12 and 13. The edges 12 and 13 can contact and rub over a windshield 19, FIG. 2, if the blade 10 is sufficiently inclined, as it may be in some instances when in operation. The outer or back edge of the blade 10 preferably is provided with a permanently attached metal back member 14 which constitutes part of the blade and is capable of being connected with the usual arm by which the blade may be moved back and forth over the windshield.

In accordance with this invention I provide, along the outermost edges of the blade 10, two trough shaped receptacles 15 and 16 which are shown empty in FIG. 1 but which, in practice, are initially filled with de-greasing material 17, FIG. 2, at the time the blade is manufactured. The de-greasing material is a material which, in a fluid state, can be introduced into the trough like receptacles 15 and 16 and which will solidify or harden in said receptacles. Also it is a material which, in its solid state, is slowly soluble by water and one which, when dissolved and rubbed over a windshield by a wiper blade, will facilitate the removal of foreign matter and particularly of grease from said windshield. Materials containing a large percentage of alum or aluminum sulphate are satisfactory for this use.

The trough shaped receptacles 15 and 16 shown in FIGS. 1 and 2 are an integral part of the elastic body 10 but they can be separately constructed, as hereinafter explained. Said receptacles 15 and 16 are each provided with a plurality of inwardly protruding spines or ribs 18 which become embedded in the de-greasing material when it solidifies in the trough shaped receptacles 15 and 16. These spines or ribs 18 prevent the bodies of solidified de-greasing material 17 from moving endwise in the trough shaped receptacles 15 and 16 and obviate the possibility of this de-greasing material being thrown out of the receptacles 15 and 16 by operation of the wiper blade after part of this material has been dissolved and washed away by water.

FIGS. 3 and 4 disclose a form of this invention wherein trough shaped receptacles which contain the de-greasing material are constructed separately from the elastic body portion of the blade so that a pair of these receptacles can easily be applied to and will become part of a blade assembly. This makes it possible to apply the separately constructed trough shaped receptacles, which carry de-greasing material, to windshield wiper blades of conventional construction such as those now in common use on motor vehicles.

By way of illustration the parts 10′, 11′, 12′, 13′ and 14′ of the wiper blade shown in FIGS. 3 and 4 are similar to the previously described parts 10, 11, 12, 13 and 14 of the wiper blade shown in FIGS. 1 and 2 but the integrally formed trough shaped receptacles 15 and 16 are omitted. It will be understood that the shape of the parts which combine to form the elastic portion of the blade can be varied and that they do vary in conventional wiper blades. However most of the conventional wiper blades have a metal back member similar to the member 14' and which is provided with edge portions 14a that overhang or are at least flush with the sides of the elastic body 10. These edge portions 14a serve as means with which separately constructed receptacles for de-greasing material can be engaged.

The separately constructed receptacles shown in FIGS. 3 and 4 comprise two parts indicated generally by A and B and each formed of thin resilient non-corrosive material, which may be sheet metal.

The member A comprises a flat part 20 having fine longitudinally extending corrugations 21 therein and having upwardly displaced, spaced apart spring clips 22 in its corrugated part. Said member A is further provided along one edge thereof with a trough shaped receptacle 23 wherein de-greasing material 17 in solid form is contained. The walls of the receptacle 23 have inwardly protruding spines 24 which anchor the de-greasing material against longitudinal displacement. A plurality of longitudinally spaced apart downwardly and inwardly bent hook shaped clips 25 are provided on the member A adjacent the receptacle 23 for engagement with the edge portions 14a of the back member 14'. If the edge portions 14a do not overhang the elastic body 10' then the clips 25 will embed themselves in said elastic body 10' and firmly grip the member 14'.

The member B comprises a flat part 26 having closely spaced longitudinal corrugations 27 and having tongue members 28 extending from one edge thereof. The tongue members 28 are shaped and positioned and dimensioned so that they can be inserted under the spring clips 22 on the member A and will be held by said clips 22. The outer edge portion of the member B is provided with a trough shaped receptacle 30 having inwardly protruding spines 31. The receptacle 30 carries degreasing material 17. A plurality of longitudinally spaced apart downwardly and inwardly bent hook shaped clips 32 are provided on the member B adjacent the trough shaped receptacle 30 for engagement with the edge portion 14a of the back plate 14' of the wiper blade. Members A and B have registering notches 33 and 34 which are suitably shaped and positioned and dimensioned to provide clearance for devices, not shown, but commonly provided to connect the back member 14' of a windshield wiper blade to an arm by which the wiper blade is operated.

The members A and B are used as a pair and become a fixed part of the wiper blade to which they are attached. They are applied by fitting them over the wiper blade from opposite sides with the tongues 28 inserted under the clips 22 and the hook shaped clips 25 engaged under the edges of the back member 14' and pressed closely against the same. When the two members A and B of a pair are thus applied the corrugations 21 and 27, which are also present in the clips 22 and tongues 28, interfit with each other and attach the members A and B very securely to the wiper blade.

The members A and B carry enough de-greasing material to ordinarily last about as long as a windshield wiper blade will last. Said members A and B are not expensive and are usually discarded with the wiper blade by which they are carried. However, it is possible to remove them from a wiper blade and replace them with new ones if desired.

In both forms of the invention hereinbefore described the de-greasing material is carried in trough shaped receptacles attached to and extending along the back or outer edge of the blade, each receptacle having an open side spaced from and directed toward the adjacent side of the blade so that water can enter between the blade and the receptacle in contacting the de-greasing material.

In the operation of either of the devices hereinbefore described when the windshield wiper is operating it will lean in the direction in which it is moving, as shown in FIG. 2, and the water indicated by W will pile up against the leading side of said blade and contact the de-greasing material 17 and some of this material will be dissolved and spread on the windshield. The presence of this dissolved material on the windshield and on the blade will result in the blade keeping the windshield clean of oil and grease film thus insuring better visibility, contributing to the safety of operation of the vehicle and contributing to the comfort of the driver.

The foregoing description and accompanying drawings clearly disclose preferred embodiments of my invention but it will be understood that this disclosure is merely illustrative and that changes may be made within the scope of the following claims.

I claim:

1. In a windshield wiper blade, a body of elastic material having a narrow windshield engaging inner edge and a wider outer edge; two longitudinally extending trough shaped receptacles rigid with said elastic blade body and extending along opposite sides thereof adjacent said outer edge, the wall of each of said receptacles having approximately the cross sectional shape of a hook curved toward the narrow inner edge of said elastic body and terminating short of the side of said elastic body in providing a water circulation space between its inner side and the adjacent side of the elastic body; and water soluble solid de-greasing material in each of said receptacles, the face of said water soluble solid de-greasing material being spaced a substantial distance from the adjacent side surface of said elastic blade body leaving said water circulation space unobstructed and providing for a free circulation of water between the face of said water soluble de-greasing material and the adjacent side of said elastic blade body.

2. In a windshield wiper blade, a blade body of elastic material having a narrow windshield engaging inner edge and a wider outer edge; and at least one longitudinally extending trough shaped elastic receptacle integral with said elastic blade body and extending throughout substantially the entire length of said blade body along a side thereof adjacent the outer edge of said body, said receptacle having an open side spaced outwardly from and directed toward the blade body; and water soluble solid de-greasing material in said receptacle, said degreasing material presenting an inner face in substantially spaced relation from the adjacent side of the blade body providing between the inner face of the de-greasing material and the blade body a channel wherein water can circulate.

3. A windshield wiper blade comprising a body of elastic material having a narrow windshield engaging inner edge and a wider outer edge; two independent trough shaped receptacles; means capable of attaching said receptacles to said elastic body with the receptacles extending along opposite sides of said elastic body adjacent to the outer edge thereof, each of said receptacles having an open side spaced outwardly from and facing an adjacent side of said elastic body when the receptacle is attached to said body and providing a space for the entrance of water between the elastic body and the receptacle; and water soluble de-greasing material in each of said receptacles, the face of said water soluble solid de-greasing material being spaced a substantial distance from the adjacent side surface of said elastic blade body leaving said water circulation space unobstructed and providing for a free circulation of water between the face of said water soluble de-greasing material and the adjacent side of said elastic blade body.

4. The combination with a windshield wiper blade having a rigid flat back member and having an elastic blade body of generally triangular cross sectional shape attached to said back member; the back member being at least approximately as wide as the wider part of the elastic body portion; two flat frame members adapted to rest on said flat back member; inwardly directed hooks rigid with said frame members adapted to hook over and engage with the edge portions of said flat back member; interfitting tongue and spring clip means carried by the respective flat frame members cooperating in securing said flat frame members to said back member; two trough shaped receptacles carried by the respective flat frame members and extending along opposite sides of the blade body throughout substantially the entire length of the blade body, each of said receptacles having an open side spaced outwardly from and facing an adjacent side of the blade body; and water soluble solid degreasing material in each of said receptacles presenting an inner face spaced outwardly a substantial distance from the adjacent side of said blade body and providing a channel for the free circulation of water between the inner face of the de-greasing material and the blade body.

5. In a windshield wiper blade, a body of elastic material having a narrow inner edge and a wider outer edge; two longitudinally extending receptacles rigid with said elastic body and extending along opposite sides thereof adjacent said wider outer edge, each of said receptacles having an open side spaced outwardly from and facing the adjacent side of said elastic body providing space for the entrance of water between the receptacle and the elastic body; de-greasing material in said receptacle, the inner face of said de-greasing material being spaced a substantial distance from the adjacent wall of said blade body; and inwardly protruding spines attached to the walls of said receptacles forming anchor means for de-greasing material in said receptacles.

6. In a windshield wiper blade, a body of elastic material having a narrow inner edge and a wider outer edge; two longitudinally extending receptacles rigid with said elastic body and disposed along opposite sides thereof adjacent said wider outer edge, each of said receptacles having an open side spaced outwardly from and facing the adjacent side of said elastic body providing space for the entrance of water between the receptacle and the elastic body; and water soluble de-greasing material in solid form composed at least partly of alum disposed in each of said de-greasing material receptacles.

References Cited in the file of this patent

UNITED STATES PATENTS

| | | |
|---|---|---|
| 1,828,715 | Oishei | Oct. 20, 1931 |
| 2,485,025 | Wattles | Oct. 18, 1949 |